United States Patent
Shah et al.

(10) Patent No.: US 9,321,441 B1
(45) Date of Patent: Apr. 26, 2016

(54) GPS BASED LEARNED CONTROL EVENT PREDICTION

(71) Applicant: Robert Bosch GmbH, Stuttgart (DE)

(72) Inventors: Ankit Shah, Canton, MI (US); Troy McCormick, Milford, MI (US); Anthony Farrell, Clinton, MI (US); Hirak Chanda, Troy, MI (US); Kenneth Brochu, Commerce, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/547,814

(22) Filed: Nov. 19, 2014

(51) Int. Cl.
| | |
|---|---|
| *B60W 50/06* | (2006.01) |
| *B60T 8/174* | (2006.01) |
| *B60R 22/36* | (2006.01) |
| *B60W 50/14* | (2012.01) |
| *B60W 10/184* | (2012.01) |
| *B60W 10/22* | (2006.01) |
| *B60R 21/16* | (2006.01) |

(52) U.S. Cl.
CPC ............... *B60T 8/174* (2013.01); *B60R 21/16* (2013.01); *B60R 22/36* (2013.01); *B60W 10/184* (2013.01); *B60W 10/22* (2013.01); *B60W 50/14* (2013.01); *B60G 2400/824* (2013.01); *B60T 2201/04* (2013.01); *B60T 2201/06* (2013.01); *B60T 2201/122* (2013.01); *B60T 2201/16* (2013.01); *B60W 2050/143* (2013.01); *B60W 2550/408* (2013.01); *B60W 2710/182* (2013.01); *B60W 2710/22* (2013.01); *B60W 2750/40* (2013.01)

(58) Field of Classification Search
None
See application file for complete search history.

(56) References Cited

U.S. PATENT DOCUMENTS

| | | | | |
|---|---|---|---|---|
| 5,913,376 A | * | 6/1999 | Takei | B60K 31/0058 180/168 |
| 5,983,161 A | * | 11/1999 | Lemelson | G01S 19/11 340/436 |
| 6,092,014 A | * | 7/2000 | Okada | G01C 21/26 340/438 |
| 6,430,488 B1 | * | 8/2002 | Goldman | B06R 25/00 307/10.1 |

(Continued)

FOREIGN PATENT DOCUMENTS

| | | |
|---|---|---|
| EP | 1045224 A2 | 10/2000 |
| EP | 1380813 | 1/2004 |

(Continued)

OTHER PUBLICATIONS

International Search Report and Written Opinion for Application No. PCT/US2015/060789 dated Feb. 12, 2016 (11 pages).

*Primary Examiner* — Thomas Tarcza
*Assistant Examiner* — Richard Goldman
(74) *Attorney, Agent, or Firm* — Michael Best & Friedrich LLP

(57) ABSTRACT

A global positioning signal based learned control event prediction method and apparatus includes a learning auxiliary module connected to a communication bus of a vehicle. The arrangement stores events and event locations using global positioning signals for a vehicle traveling along a path. When the vehicle travels the same path a second time, the detected events and event locations are determined. When the events match at the same event locations, a predictive action is determined for a future occurrence of the vehicle approaching the event location. Thus, as the vehicle approaches the event location, the predictive action, for example pre-filling of the vehicle brakes or pre-tensioning of the seat belts occurs.

20 Claims, 5 Drawing Sheets

(56) References Cited

U.S. PATENT DOCUMENTS

| | | | | |
|---|---|---|---|---|
| 7,149,625 B2* | 12/2006 | Mathews | | G01C 21/26 |
| | | | | 701/410 |
| 7,698,055 B2* | 4/2010 | Horvitz | | G08G 1/0104 |
| | | | | 342/357.31 |
| 7,751,973 B2* | 7/2010 | Ibrahim | | B60W 50/14 |
| | | | | 340/332 |
| 7,933,699 B2* | 4/2011 | Hara | | B60R 16/0231 |
| | | | | 340/438 |
| 8,335,635 B2* | 12/2012 | Hyde | | F02D 41/021 |
| | | | | 701/114 |
| 8,364,399 B2* | 1/2013 | Wendling | | B60G 17/0152 |
| | | | | 701/400 |
| 2002/0198632 A1* | 12/2002 | Breed | | B60N 2/2863 |
| | | | | 701/1 |
| 2005/0012386 A1* | 1/2005 | Nakano | | B60T 8/172 |
| | | | | 303/114.1 |
| 2005/0080565 A1* | 4/2005 | Olney | | B60K 31/0008 |
| | | | | 701/301 |
| 2005/0090938 A1* | 4/2005 | Ranelli | | G05D 1/0278 |
| | | | | 701/1 |
| 2008/0086253 A1* | 4/2008 | Nakayama | | B60T 7/122 |
| | | | | 701/80 |
| 2009/0043439 A1* | 2/2009 | Barfoot | | G05D 1/0297 |
| | | | | 701/25 |
| 2009/0125170 A1* | 5/2009 | Noffsinger | | B60L 7/16 |
| | | | | 701/20 |
| 2009/0319172 A1* | 12/2009 | Almeida | | G01C 21/20 |
| | | | | 701/533 |
| 2010/0106603 A1* | 4/2010 | Dey | | G01C 21/3484 |
| | | | | 705/14.63 |
| 2010/0292886 A1* | 11/2010 | Szczerba | | G01C 21/365 |
| | | | | 701/31.4 |
| 2011/0098922 A1* | 4/2011 | Ibrahim | | B60W 40/08 |
| | | | | 701/532 |
| 2011/0208399 A1* | 8/2011 | Fekete | | G08G 1/0104 |
| | | | | 701/93 |
| 2012/0036016 A1* | 2/2012 | Hoffberg | | G05B 15/02 |
| | | | | 705/14.58 |
| 2012/0197507 A1* | 8/2012 | Custer | | B60K 31/0008 |
| | | | | 701/96 |
| 2013/0345958 A1* | 12/2013 | Paek | | G01C 21/3679 |
| | | | | 701/400 |
| 2014/0172253 A1* | 6/2014 | Palmer | | B60W 10/11 |
| | | | | 701/56 |
| 2014/0288799 A1* | 9/2014 | Elwart | | B60W 40/09 |
| | | | | 701/96 |
| 2014/0297119 A1* | 10/2014 | Giovanardi | | F15B 13/0444 |
| | | | | 701/38 |
| 2014/0297172 A1* | 10/2014 | Huelsen | | G01S 13/931 |
| | | | | 701/301 |
| 2015/0134206 A1* | 5/2015 | Matsunaga | | B60W 20/104 |
| | | | | 701/48 |
| 2015/0284008 A1* | 10/2015 | Tan | | B60W 50/0098 |
| | | | | 701/28 |

FOREIGN PATENT DOCUMENTS

| | | |
|---|---|---|
| EP | 2017774 A2 | 1/2009 |
| WO | 2012072094 A1 | 6/2012 |

* cited by examiner

GPS BASED LEARNED CONTROL EVENT PREDICTION

BACKGROUND

The present invention relates to a method and apparatus for predicting future events at an event location along a known path. Events along the path are recorded and when the same event occurs at the same event location, a predictive action occurs when the vehicle is approaching the event location.

SUMMARY

In one embodiment, the invention provides a method for identifying and predicting events for a vehicle that routinely drives a known path that includes determining particular locations of the vehicle along the known path based on global positioning signals; sensing events along the known path with sensors on the vehicle; matching and storing the events for particular locations of the vehicle as determined from the global positioning signals; learning a particular event location from repeated sensing of the same event at the same particular location; determining and storing a predictive action for the vehicle based on the events for the particular event location; and providing a control signal to begin performance of the predictive action when the vehicle is at least one of a certain time and predetermined distance from the event location.

In one embodiment, the predictive action comprises at least one of: a) pre-filling of brakes, b) pre-tensioning of seat belts, c) enabling a stability control to an ON state when the stability control is initially in an OFF state, d) providing a warning to a vehicle operator, e) selecting thresholds and control parameters for a specific terrain, and f) adjusting or modifying a threshold.

In another embodiment, a vehicle-to-vehicle transceiver receives wireless signals from nearby vehicles that include particular event locations and corresponding predictive actions. Further, the vehicle-to-vehicle transceiver transmits wireless signals that include particular event locations and corresponding predictive actions determined by the learning auxiliary module.

In one embodiment, the particular event location is a blind curve and the predictive action is providing a warning to a vehicle operator before the particular event location is approached.

Another embodiment includes sensing stationary objects near the vehicle with radar and learning the presence of stationary objects at a particular location from repeatedly sensing the same stationary object at the same location, wherein accuracy of the particular location of the vehicle along the known path is based on the global positioning signals and the presence of learned stationary objects.

In one embodiment the event comprises at least one of an anti-lock brake system event, a traction control event, a stability control event, an electronic brake force distribution event, a hill hold control event, a hill descent control event, a trailer sway control event, a banked curve event, a wheel lift control event, a sharp turn event, an axle deflection event and an off road terrain event.

In another embodiment, the auxiliary module determines and stores a direction that the vehicle is traveling on the known path, and provides a control signal to begin performance of a predictive action when the vehicle is approaching the event.

In another embodiment the invention provides a global positioning signal based learned control event prediction system comprising a learning auxiliary module secured on a vehicle, the learning auxiliary module configured to: receive stability information signals from a stability control module and for sending stability control signals to the stability control module; receive engine information signals from an engine control module and to transmit engine control signals to engine control module; receive transmission information signals from a transmission module and to transmit transmission control signals to the transmission module; receive information signals from an airbag/ORC (Occupant Restraint Control) control module and to transmit airbag/ORC control signals to the airbag/ORC control module; and receive global positioning signals from a global positioning signal module for determining a location of the vehicle, wherein the learning auxiliary module identifies significant events at particular locations along a known path and when the same significant event occurs multiple times at a particular location, the learning auxiliary module stores the event location for the learned event, the learned event, and determines and stores a predictive action corresponding to the learned event in a memory of the learning auxiliary module, and wherein as the vehicle approaches one of the particular event locations, the learning auxiliary module provides an output to cause a corresponding predictive action before the vehicle is at the particular event location.

In one embodiment, a global positioning signal based learned control event prediction system provided with a vehicle, includes a learning auxiliary module; a stability control module for providing stability information signals to the learning auxiliary module and for receiving stability control signals from the learning auxiliary module; an engine control module for providing engine information signals to the learning auxiliary module and for receiving engine control signals; a transmission module for providing transmission information signals to the learning auxiliary module and for receiving transmission control signals from the learning auxiliary module; an airbag/ORC control module for providing information signals to the learning auxiliary module and for receiving airbag/ORC control signals from the learning auxiliary module; and a global position signal module for receiving global positioning signals and providing location signals to the learning auxiliary module, wherein the learning auxiliary module stores significant events at particular locations along a known path and when the same significant event occurs multiple times, a learned event is stored in a memory of the learning auxiliary module, and wherein the learning auxiliary module determines and stores a predictive action for the learned event at the event location.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
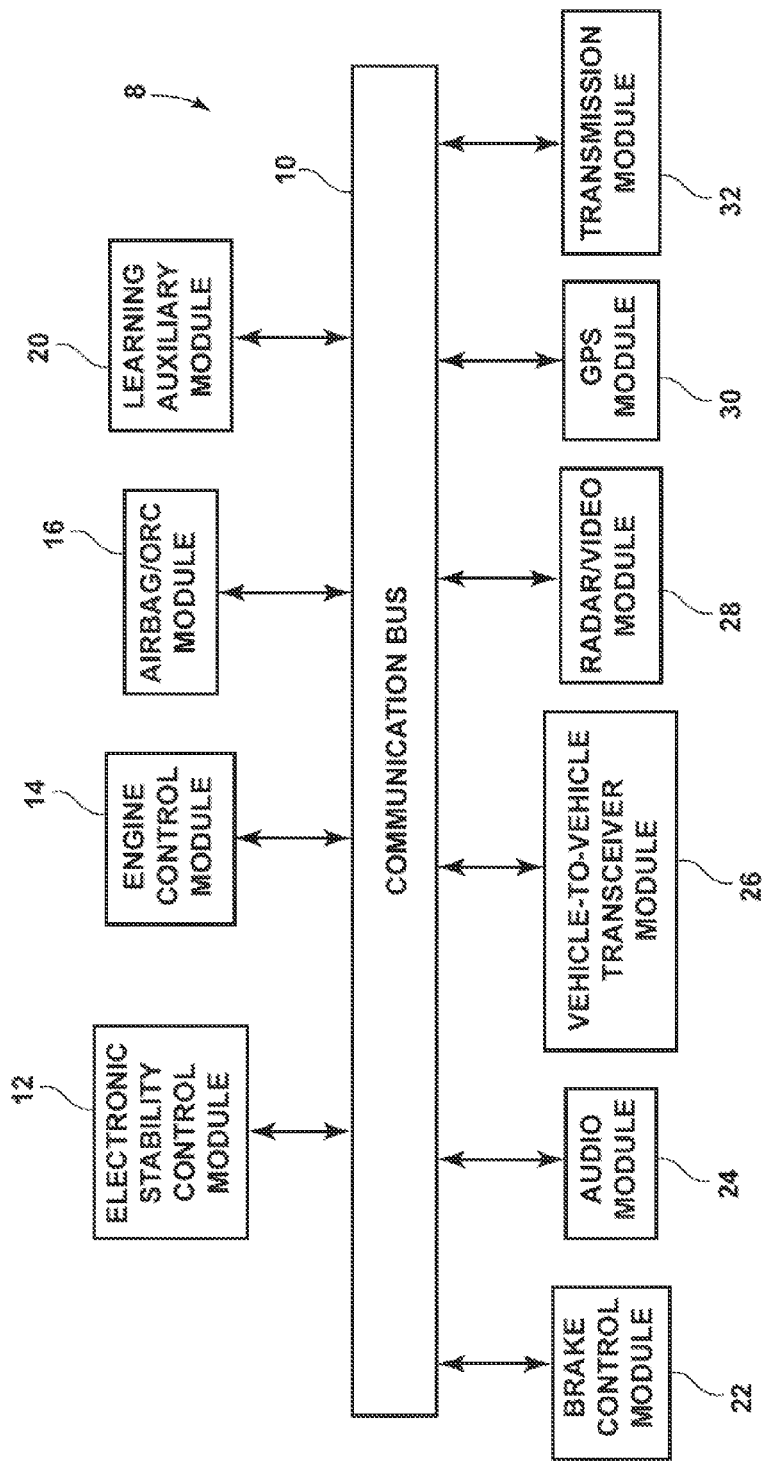
FIG. 1 shows a block diagram of vehicle modules connected via a communication bus.

FIG. 1 shows a block diagram of a GPS based learned control event prediction system 8 that includes electronic control modules connected via a network or communication bus 10 within a vehicle. The control modules include an electronic stability control (ESC) module 12, an engine control module 14, an air bag/occupant restraint control (ORC) module 16 and a learning auxiliary module 20 connected to the communication bus 10. The vehicle also includes a brake control module 22, an audio module 24, a vehicle-to-vehicle transceiver module 26, a radar/video module 28, a global positioning system (GPS) module 30 and a transmission module 32 connected to the communication bus 10. The learning auxiliary module 20 and the other modules are secured on a vehicle.

The learning auxiliary module 20 is configured to receive stability information signals from the ESC module 12 and to send stability control signals to the ESC module 12 over the communication bus 10. Further, the learning auxiliary module 20 is configured to receive engine information signals from the engine control module 14 and to transmit engine control signals to the engine control module over the bus 10. The learning auxiliary module 20 also receives transmission information signals from the transmission module 32 and transmits transmission control signals to the transmission module 32 over the bus 10. Further, the learning auxiliary module 20 receives information signals from an airbag/ORC control module and transmits airbag/ORC control signals to the airbag/ORC control module over the bus 10. Finally, the learning auxiliary module receives global positioning signals from a global position signal module for determining a location of the vehicle.

Figure 2:
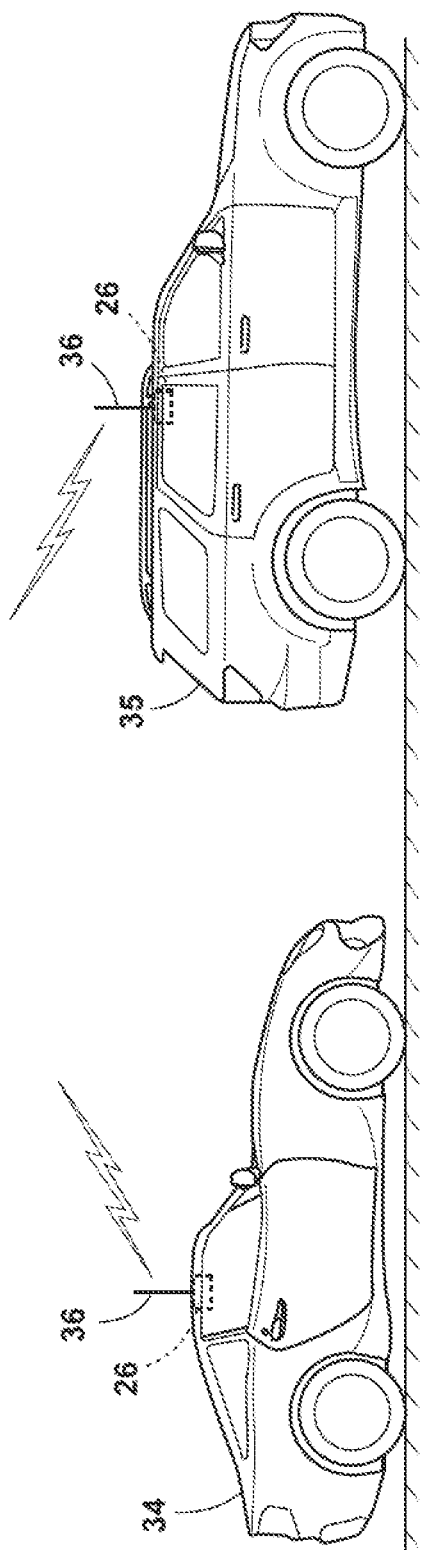
FIG. 2 a vehicle-to-vehicle communication arrangement.

FIG. 2 illustrates the arrangement wherein vehicle-to-vehicle transceiver modules 26 disposed in vehicles 34, 35 transmit wireless signals to each other and receive corresponding wireless signals via antennas 36. The wireless signals include information provided from respective learning auxiliary modules 20 as discussed below. While vehicles 34, 35 are illustrated, any type of conveyance is contemplated.

Figure 3:
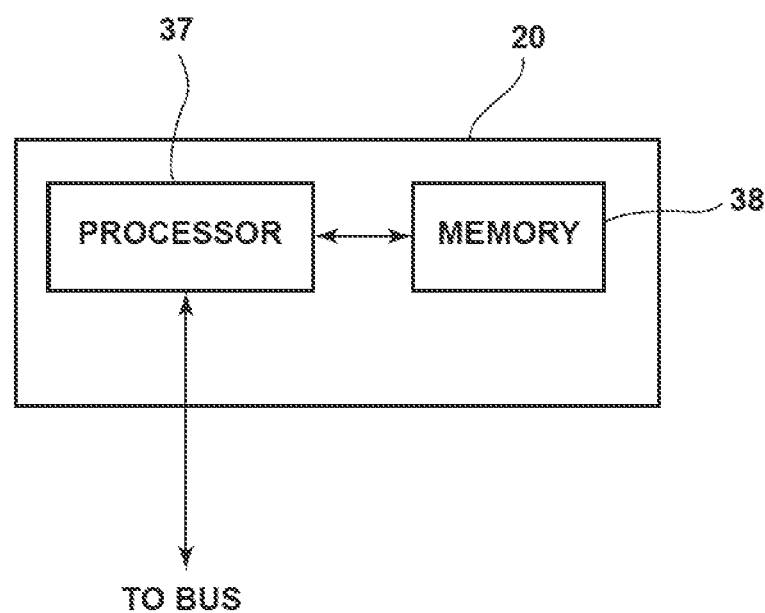
FIG. 3 shows a block diagram of a learning auxiliary module.

FIG. 3 shows the learning auxiliary module 20 including a processor 37 and a memory 38. The memory 38 is a non-volatile memory in some embodiments. The memory stores events, event locations, predictive actions and additional information as discussed below.

Operation

Figure 4:
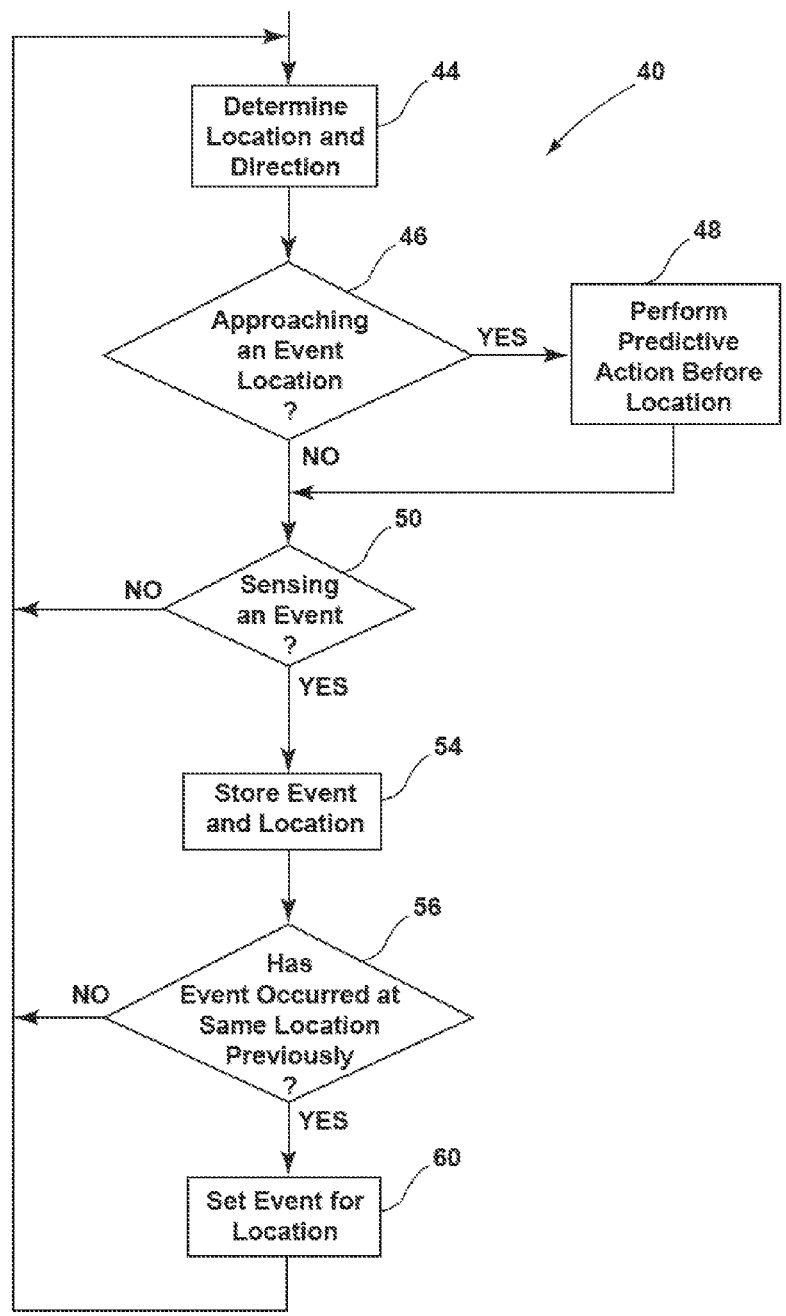
FIG. 4 shows a flowchart representing operation of the learned control event prediction system.

FIG. 4 shows a flowchart or program 40 that illustrates operation of the GPS based learned control event prediction system 8. In a beginning step 44, a control or processor 37 of the learning auxiliary module 20 receives global positioning signals from GPS module 30 and determines location coordinates for the vehicle 34 traveling along a known path or route. Further, a sequence of GPS signals or other sensors determine a direction of travel for the vehicle at step 44. Subsequently, the learning auxiliary module 20 advances to decision step 46.

At decision step 46 shown in FIG. 4, the processor 37 of the control module 20 identifies whether the vehicle is approaching an event location by searching for a nearby event location in a look-up virtual table stored in memory 38. One example of a lookup virtual table with values is as follows.

| Latitude | Longitude | Event | Control ECU Module |
|---|---|---|---|
| −119.47 | 39.02 | ABS Event | ESC |
| −82.68 | 40.1 | ESP Event | ESC |
| −110.34 | 45.09 | TCS Event | ESC |
| −164.03 | 10.45 | Off Road Event | ESC |

The latitude and longitude define an event location stored in memory 38, the type of event (ABS, ESP, TCS, Off Road) previously was stored in the memory 38 for the location. Further, the direction of travel is stored. The module in the above virtual table, is the ESC module 12 in each instance. In other instances, the brake control module 22 or the airbag/ORC module 16 is stored. Any of the modules shown in FIG. 1 and additional modules (not shown) are capable of being controlled by the learning auxiliary module 20. A specific feature/predictive action to be controlled by the ESC module 12 is also stored in the memory 38, although not illustrated in the virtual table.

Each of the event locations, events and module shown in the above table corresponds to a type of event that previously occurred at least two times at the event location along a known path. Thus, the event locations and the corresponding predictive actions are provided for use in the global positioning signal based learned control event prediction system 8.

Returning to the flowchart in FIG. 4, after approaching an event location along a known path is determined by the processor 37, the processor advances to step 48. At step 48, the learning auxiliary module 20 outputs control signals to cause one or more of the other modules, such as the ESC module 12 taken from the above virtual table, to perform one or more predictive actions before the vehicle advances to the event location. More specifically, the learning auxiliary module 20 provides a control signal so that the selected control module begins performance of the predictive action when the vehicle is traveling along the known path at least one of a certain time and a predetermined distance from the corresponding event location.

After performing the predictive action, the learning auxiliary module 20 advances to decision step 50. Returning to decision step 46, in the instance when the control module 20 determines the vehicle is not approaching an event location, the processor advances to decision step 50.

At decision step 50 shown in FIG. 4, the learning auxiliary module 20 determines whether a sensing event is occurring. If no event is occurring, the processor returns to step 44. If a sensing event is occurring, the processor 37 advances to step 54. At step 54, the processor stores the type of event and the event location with the GPS coordinates. The term "event" is directed to a significant event that has a significant outcome on the operation of the vehicle, the comfort of the operator, and other purposes. Not all detected events are recorded or stored. After step 54, the learning auxiliary module 20 then advances to decision step 56.

At decision step 56, the processor determines whether the event has occurred at the same location previously. If the event matches an event at the same location, the processor 37 stores or flags the learned event for the particular location of the vehicle as determined from the GPS signals in memory 38. The particular location is learned and stored as a particular learned event location. If no matching occurs, the learning auxiliary module 20 returns to step 44 and repeats the process shown in the flowchart 40 of FIG. 4.

At decision step 56, when the same event has occurred previously at the same location, the processor 37 advances to step 60. At step 60, the location is set as a predictive control event at the event location. Further, a predictive action to occur in view of the predictive control event, before a vehicle advances to the event location is also determined and stored. Thereafter, the processor returns to step 44. An event location corresponds to longitude and latitude values as shown in the virtual table above. Elevation may also be stored for an event location. Thereafter, the processor 37 returns to step 44 and repeats the process shown in the flowchart of FIG. 4.

While not shown in FIG. 4, in the event that vehicle 34 is in vehicle-to-vehicle communication as shown in FIG. 2, the flowchart shown in FIG. 4 would include the extra step of receiving and storing event information, including the type of event and the event location from another vehicle. The event information is stored as shown in step 54 and compared to determine an event location. In some embodiments, event locations and the information shown in the above virtual table and discussed herein is provided from the other vehicle. Finally, the host vehicle 34 wirelessly transmits information regarding sensed events and set event locations to another vehicle 35 in some embodiments.

Specific examples of events and locations that are measured, determined and stored are as follows. Sensed active and passive events include an anti-lock brake system (ABS) event, a traction control event, a stability control event, for example for a banked curve event or a change in elevation event, a hill hold control event, a hill descent control event, an electronic brake force distribution (EBD) event, a trailer sway control event for an attached trailer, a wheel lift control event or sharp turn event, an axle deflection event, an off road terrain event, the detection of stationary objects and the detection of other vehicles.

The learning auxiliary module 20 provides outputs to other modules to perform various predictive actions, including brake pre-fill, seat belt pre-tensioning, turning on or off the ESC module, provide an audible or visual warning, and finally choosing or selecting thresholds and control parameters for a specific terrain. For example, a transmission module may adjust or modify a selected gear for an off road event location, depending on a specific terrain of sand, mud or snow. Failsafe adjustments or modifications to thresholds of other devices and modules are also contemplated. In one embodiment, the learning auxiliary module 20 enables the ESC module 12 to an ON state when the stability control is initially in an OFF state.

EXAMPLES

The radar/video module 28, which represents either a radar module, or both of radar and a video sensing module, detects the presence of stationary objects at specific locations near the vehicle. The location and information including the exact location of the stationary object are stored in the memory 38 by processor 37 of the learning auxiliary module 20. After the event of detecting the stationary object has been detected at least two times, the location is set as an event location. Thus, when the vehicle approaches the event location in the future, the stationary object is ignored for purposes of collision avoidance detection or other purposes. Therefore, false collision alerts are prevented and collision avoidance is improved.

In another instance, the beginning of driving a vehicle off-road is detected. After detection, the predictive action includes providing a control signal to the transmission module 32 to switch a transmission to a lower gear in view of the predicted change in terrain. Therefore, vehicle operation is improved.

In another instance, the particular event location is a blind curve and the predictive action is providing a control signal to the audio module 24 to warn a vehicle operator before the particular event location is approached.

In another instance, when the vehicle approaches a blind intersection location, the learning auxiliary module 20 provides 1) a control signal to the air bag/ORC module 16 to automatically pre-tension the seatbelts, 2) a control signal to the brake control module 22 to pre-fill the brakes, and 3) a control signal to the audio module 24 to provide an audible warning.

Figure 5:
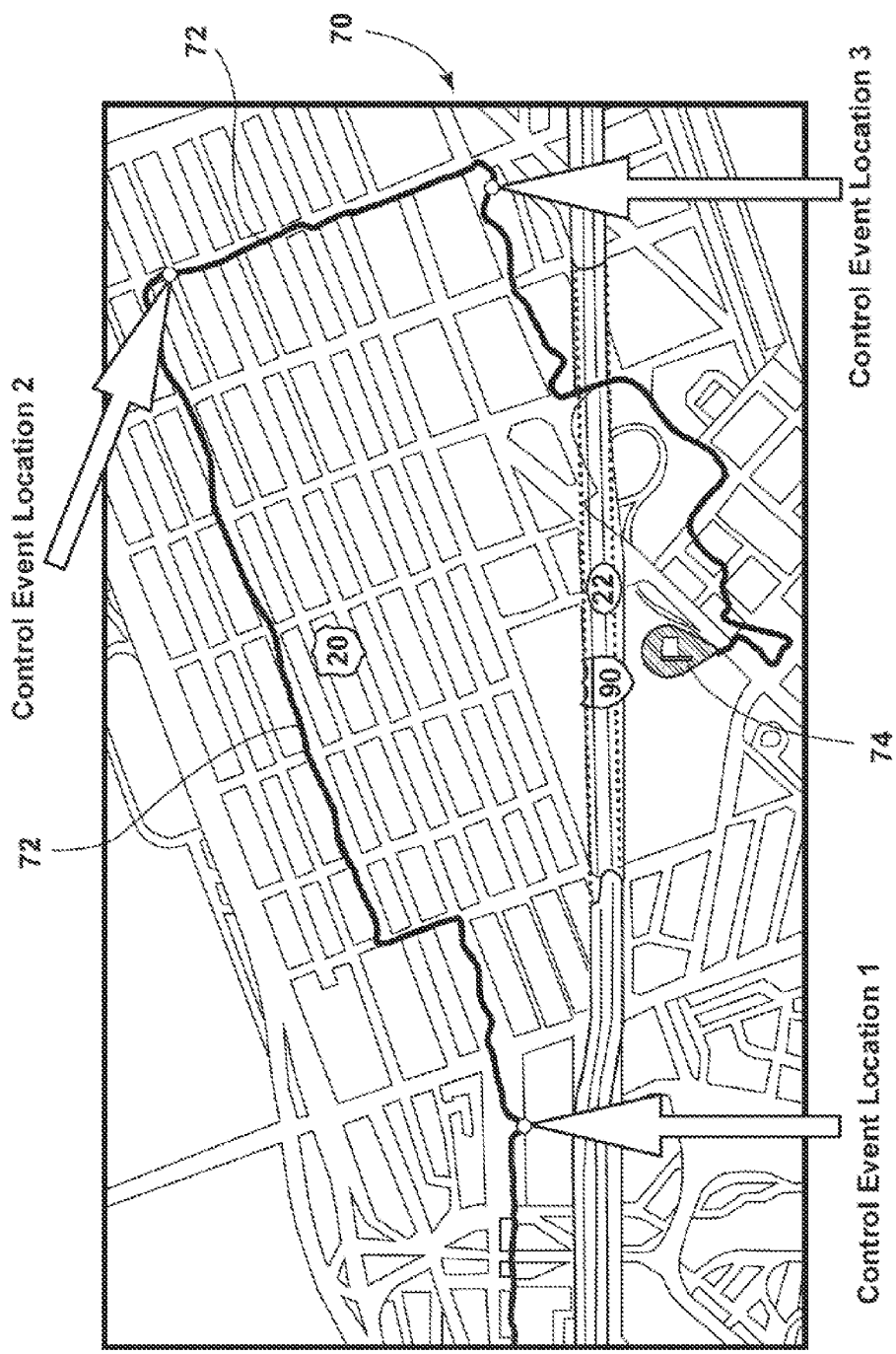
FIG. 5 shows a map of a known path for a vehicle.

The map 70 shown in FIG. 5 illustrates a known path or route 72 that a vehicle routinely drives to a destination 74. Along the path three event locations where control events have occurred are illustrated by arrows. As discussed above, before advancing to an event location for a control event, the auxiliary module 20 performs predictive actions corresponding to the particular event as discussed above.

Each of the modules shown in FIG. 1 may include a digital processor, application specific integrated circuit (ASIC) or another control circuit, along with various sensors in some instances.

In some embodiments, accuracy of the particular location of the vehicle along the known path is based on the global positioning signals, and further based on the presence of learned stationary objects.

While the learning auxiliary module 20 is illustrated as a separate module, in some embodiments the functions thereof can be combined with a processor of a different one of the modules shown in FIG. 1. In this manner, modules may perform multiple operations.

Thus, the invention provides, among other things, an approach for enhancing driving experience of a vehicle 34 travelling along known or commonly traveled paths. Various features and advantages of the invention are set forth in the following claims.

What is claimed is:

1. A method for identifying and predicting events for a vehicle that routinely drives a known path comprising:
   determining particular locations of the vehicle along the known path based on global positioning signals;
   sensing events along the known path with sensors on the vehicle;
   matching and storing the events for particular locations of the vehicle as determined from the global positioning signals;
   learning a particular event location from repeated sensing of the same event at the same particular location;
   determining and storing a predictive action for the vehicle based on the events for the particular event location; and
   providing a control signal to begin performance of the predictive action when the vehicle is at least one of a certain time and predetermined distance from the event location.

2. The method according to claim 1, wherein the predictive action comprises at least one of: a) pre-filling of brakes, b) pre-tensioning of seat belts, c) enabling a stability control to an ON state when the stability control is initially in an OFF state, d) providing a warning to a vehicle operator, e) selecting thresholds and control parameters for a specific terrain, and f) adjusting or modifying a threshold.

3. The method according to claim 1, including the step of receiving wireless signals from nearby vehicles that include particular event locations and corresponding predictive actions.

4. The method according to claim 3, including the step of transmitting wireless signals to nearby vehicles that include particular event locations and corresponding predictive actions.

5. The method according to claim 1, wherein the particular event location is a blind curve and the predictive action is providing a warning to a vehicle operator before the particular event location is approached.

6. The method according to claim 1, including the steps of:
sensing stationary objects near the vehicle with radar; and
learning the presence of stationary objects at a particular location from repeatedly sensing the same stationary object at the same location,
wherein accuracy of the particular location of the vehicle along the known path is based on the global positioning signals and the presence of learned stationary objects.

7. The method according to claim 1, wherein the event comprises at least one of an anti-lock brake system event, a traction control event, a stability control event, an electronic brake force distribution event, a hill hold control event, a hill descent control event, a trailer sway control event, a banked curve event, a wheel lift control event, a sharp turn event, an axle deflection event and an off road terrain event.

8. The method according to claim 1, including determining and storing a direction that the vehicle is traveling on the known path, and providing the control signal to begin performance of the predictive action when the vehicle is approaching the event location in the stored direction.

9. A global positioning signal based learned control event prediction system comprising a learning auxiliary module secured on a vehicle, the learning auxiliary module configured to:
receive stability information signals from a stability control module and for sending stability control signals to the stability control module;
receive engine information signals from an engine control module and to transmit engine control signals to engine control module;
receive transmission information signals from a transmission module and to transmit transmission control signals to the transmission module;
receive information signals from an airbag/ORC (Occupant Restraint Control) control module and to transmit airbag/ORC control signals to the airbag/ORC control module; and
receive global positioning signals from a global positioning signal module for determining a location of the vehicle,
wherein the learning auxiliary module identifies significant events at particular locations along a known path and when the same significant event occurs multiple times at a particular location, the learning auxiliary module stores the event location for the learned event, the learned event, and determines and stores a predictive action corresponding to the learned event in a memory of the learning auxiliary module, and
wherein as the vehicle approaches one of the particular event locations, the learning auxiliary module provides an output to cause a corresponding predictive action before the vehicle is at the particular event location.

10. The prediction system according to claim 9, wherein the memory storing the event location and storing the corresponding predictive action comprises a non-volatile memory.

11. The prediction system according to claim 9, wherein the predictive action comprises at least one of: a) pre-filling of brakes, b) pre-tensioning of seat belts, c) enabling a stability control to an ON state when the stability control is initially in an OFF state, d) providing a warning to a vehicle operator, e) selecting thresholds and control parameters for a specific terrain, and f) adjusting or modifying a threshold.

12. The prediction system according to claim 9, wherein the learning auxiliary module is configured to receive and transmit wireless signals via a vehicle-to-vehicle transceiver module to other vehicles, the wireless signals including information provided from respective learning auxiliary modules.

13. The prediction system according to claim 9, wherein the event comprises at least one of an anti-lock brake system event, a traction control event, a stability control event, an electronic brake force distribution event, a hill hold control event, a hill descent control event, a trailer sway control event, a banked curve event, a wheel lift control event, a sharp turn event, an axle deflection event and an off road terrain event.

14. The prediction system according to claim 9, wherein the learning auxiliary module is configured to determine and store a direction that the vehicle is traveling on the known path, and to provide the control signal to begin performance of the predictive action when the vehicle is approaching the event location in the stored direction.

15. A global positioning signal based learned control event prediction system provided with a vehicle, comprising:
a learning auxiliary module;
a stability control module for providing stability information signals to the learning auxiliary module and for receiving stability control signals from the learning auxiliary module;
an engine control module for providing engine information signals to the learning auxiliary module and for receiving engine control signals;
a transmission module for providing transmission information signals to the learning auxiliary module and for receiving transmission control signals from the learning auxiliary module;
an airbag/ORC (Occupant Restraint Control) control module for providing information signals to the learning auxiliary module and for receiving airbag/ORC control signals from the learning auxiliary module; and
a global position signal module for receiving global positioning signals and providing location signals to the learning auxiliary module,
wherein the learning auxiliary module stores significant events at particular locations along a known path and when the same significant event occurs multiple times, a learned event is stored in a memory of the learning auxiliary module, and
wherein the learning auxiliary module determines and stores a predictive action for the learned event at the event location.

16. The prediction system of claim 15, further comprising a vehicle-to-vehicle transceiver module for receiving information from the learning auxiliary module and transmitting the information via wireless signals to the learning auxiliary modules of other vehicles, the vehicle-to-vehicle transceiver module receiving wireless signals with information from other vehicles and providing the information to the learning auxiliary module.

17. The prediction system of claim 15, wherein the predictive action comprises at least one of: a) pre-filling of brakes, b) pre-tensioning of seat belts, c) enabling a stability control to an ON state when the stability control is initially in an OFF state, d) providing a warning to a vehicle operator, e) selecting thresholds and control parameters for a specific terrain, and f) adjusting or modifying a threshold.

18. The prediction system of claim 15, wherein the event comprises at least one of an anti-lock brake system event, a traction control event, a stability control event, an electronic brake force distribution event, a hill hold control event, a hill descent control event, a trailer sway control event, a banked curve event, a wheel lift control event, a sharp turn event, an axle deflection event and an off road terrain event.

19. The prediction system of claim 15, the system further comprising an audio module, and wherein the particular event location is a blind curve and the learning auxiliary module provides a control signal to the audio module, wherein the audio module performs the predictive action of providing warning to a vehicle operator before the particular event location is approached.

20. The prediction system of claim 15, wherein the learning auxiliary module is configured to determine and store a direction that the vehicle is traveling on the known path, and to provide the control signal to begin performance of the predictive action when the vehicle is approaching the event location in the stored direction.

\* \* \* \* \*